US006665406B1

(12) United States Patent
Phillips

(10) Patent No.: US 6,665,406 B1
(45) **Date of Patent: *Dec. 16, 2003**

(54) VARIABLE DENSITY VERIFICATION

(75) Inventor: George K. Phillips, Paso Robles, CA (US)

(73) Assignee: Verify First Technologies, Inc., Paso Robles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,148

(22) Filed: Apr. 20, 2000

Related U.S. Application Data

(63) Continuation of application No. 09/046,571, filed on Mar. 23, 1998, now Pat. No. 6,396,927, which is a continuation-in-part of application No. 08/602,243, filed on Feb. 16, 1996, now Pat. No. 5,873,604, which is a continuation-in-part of application No. 08/568,587, filed on Dec. 7, 1995, now Pat. No. 5,772,248, and a continuation-in-part of application No. 08/450,975, filed on May 25, 1995, now Pat. No. 5,704,651.

(51) Int. Cl.$^7$ .............................. G09C 5/00; G04L 9/00

(52) U.S. Cl. .......................... 380/54; 430/10; 162/140; 427/7; 427/145; 427/259; 283/72

(58) Field of Search .......................... 430/10; 162/140; 427/7, 144, 145, 259, 272, 282; 101/490, 491; 106/31.01, 31.13; 283/67, 72, 73, 91–94, 902; 380/54, 55

(56) References Cited

U.S. PATENT DOCUMENTS

| | | | | |
|---|---|---|---|---|
| 3,702,920 A | | 11/1972 | Taylor | 219/406 |
| 3,802,724 A | | 4/1974 | Gosnell | 283/9 |
| 3,887,742 A | * | 6/1975 | Reinnagel | 428/211 |
| 4,227,719 A | | 10/1980 | McElligott et al. | 283/8 |
| 4,227,720 A | | 10/1980 | Mowry, Jr. et al. | 283/8 |
| 4,265,469 A | * | 5/1981 | Mowry, Jr. et al. | 283/8 |
| 4,310,180 A | | 1/1982 | Mowry, Jr. et al. | 283/8 |
| 4,421,560 A | | 12/1983 | Kito et al. | 106/21 |
| 4,425,161 A | | 1/1984 | Shibahashi et al. | 106/21 |

(List continued on next page.)

FOREIGN PATENT DOCUMENTS

| | | |
|---|---|---|
| DE | 3921636 A1 | 3/1991 |
| WO | WO 96/10385 | 11/1996 |

OTHER PUBLICATIONS

McLoone, Sharon, *Inks that are Mightier than the Counterfeiter*, FORM, May 1995, pp. 88, 90, and 93.
Scaman, Steven S., Lex, Elizabeth A., *FLEXO*, Dec. 1994, pp. 14 and 16–17.

*Primary Examiner*—Gilberto Barron
*Assistant Examiner*—Paul Callahan
(74) *Attorney, Agent, or Firm*—Michael J. Bolan; Bingham McCutchen LLP

(57) ABSTRACT

A counterfeit-resistant document comprises a contrasting layer and a dynamic camouflaging layer. The contrasting layer is highly contrastive and includes a latent message that can be reproduced over a broad range of copy device control settings. The dynamic camouflaging layer is applied over the contrasting layer to suppress the latent message. The visual density of the dynamic camouflaging layer, which comprises a camouflage pattern that is printed in thermochromic ink, inversely varies with temperature. In this manner, the dynamic camouflaging layer is inactivated at room temperatures so that the latent message is suppressed on the original document, and activated at scanning temperatures so that the latent message is exhibited on a reproduction of the original document.

44 Claims, 16 Drawing Sheets

U.S. PATENT DOCUMENTS

| | | | | | |
|---|---|---|---|---|---|
| 4,463,970 | A | | 8/1984 | Kaule et al. | 283/72 |
| 4,579,370 | A | | 4/1986 | Corwin et al. | 283/72 |
| 4,632,429 | A | | 12/1986 | Gardner et al. | 283/91 |
| 4,717,710 | A | | 1/1988 | Shimizu et al. | 503/213 |
| 4,920,991 | A | | 5/1990 | Shibahashi et al. | 132/73 |
| 4,927,180 | A | | 5/1990 | Trundle et al. | 283/70 |
| 5,018,767 | A | | 5/1991 | Wicker | 283/67 |
| 5,077,101 | A | * | 12/1991 | Conway et al. | 428/17 |
| 5,087,507 | A | | 2/1992 | Heinzer | 428/195 |
| 5,149,140 | A | | 9/1992 | Mowry, Jr. et al. | 283/93 |
| 5,171,040 | A | | 12/1992 | Orndorff | 283/93 |
| 5,193,853 | A | | 3/1993 | Wicker | 283/85 |
| 5,193,854 | A | | 3/1993 | Borowski, Jr. et al. | 283/87 |
| 5,197,765 | A | | 3/1993 | Mowry, Jr. et al. | 283/93 |
| 5,202,677 | A | | 4/1993 | Parker et al. | 340/786 |
| 5,281,570 | A | | 1/1994 | Hasegawa et al. | 503/216 |
| 5,282,651 | A | | 2/1994 | Alonso | 283/117 |
| 5,344,192 | A | | 9/1994 | Phillips | 283/91 |
| 5,372,387 | A | | 12/1994 | Wajda | 283/87 |
| 5,427,415 | A | | 6/1995 | Chang | 283/67 |
| 5,516,362 | A | | 5/1996 | Gundjan | 106/31.32 |
| 5,536,046 | A | | 7/1996 | Chang | 283/67 |
| 5,538,290 | A | | 7/1996 | Diamond | 283/113 |
| 5,591,255 | A | | 1/1997 | Small et al. | 106/21 |
| 5,636,874 | A | | 6/1997 | Singer | 283/84 |
| 5,695,220 | A | | 12/1997 | Phillips | 283/91 |
| 5,704,651 | A | | 1/1998 | Phillips | 283/93 |
| 5,762,378 | A | | 6/1998 | Phillips | 283/72 |
| 5,772,248 | A | | 6/1998 | Phillips | 285/91 |
| 5,826,915 | A | | 10/1998 | Gregory, Jr. | 283/67 |
| 5,826,916 | A | | 10/1998 | Phillips | 283/67 |
| 5,873,604 | A | | 2/1999 | Phillips | 283/70 |

* cited by examiner

VARIABLE DENSITY VERIFICATION

CROSS REFERENCE TO RELATED APPLICATIONS

This is a continuation of U.S. application Ser. No. 09/046,571, now U.S. Pat. No. 6,396,927 filed on Mar. 23, 1998, which is a continuation-in-part-of U.S. application Ser. No. 08/602,243, filed on Feb. 16, 1996, now U.S. Pat. No. 5,873,604, which is a continuation-in-part of U.S. application Ser. No. 08/450,975, filed on May 25, 1995, now U.S. Pat. No. 5,704,651, and U.S. application Ser. No. 08/568,587, filed on Dec. 7, 1995, now U.S. Pat. No. 5,772,248. The disclosures of each of these prior applications are hereby incorporated by reference in their entirety.

FIELD OF THE INVENTION

The present invention pertains to the field of security systems for documents, including more particularly to novel duplication resistant documents and methods of creating duplication resistant documents.

BACKGROUND

The importance of making documents safe from duplication and alteration is readily apparent. The advent of improved photocopy equipment, particularly high resolution color photocopy equipment, as well as desk top publishing and digital scanning, has provided the unscrupulous with the means for unauthorized duplication of original documents for the purpose of passing them off, with or without alteration, as the original document. The quality of the reproductions obtainable through these means is so good that, it is difficult to distinguish original copies from color reproductions. Even if the duplication is not exact, the reproduction often appears authentic in the absence of the original for comparison. This problem is well known to the issuers of such original documentation, and considerable attention has been given to find ways and means to prevent unauthorized duplication of such documents by photocopiers or other electronic methods.

Many techniques have been developed to prevent improper reproduction of original documents. One of the more known techniques is based on the phenomenon that photographic copiers have an element value (sometimes referred to as element frequency) threshold above which the photocopier is unable to distinguish the individual elements of the pattern of for example, halftone printing. In general, a pattern with a low line screen value of large sized elements is more easily reproducible than a pattern with a high line screen value of small sized elements.

In accordance with this technique, a hidden warning message, such as "VOID" or "COPY," is printed in a halftone over a halftone background printed on a substrate. The line screen value of the hidden warning message is selected, such that the halftone elements of the hidden warning message are reproduced when photocopied. The line screen value of the background; however, is selected, such that, the halftone elements of the background are not reproduced when photocopied. As a result, the hidden warning message will appear on duplicates of the original document made by photocopying. This method is also used by reversing the halftones of the hidden warning message and the background such that the elements of the hidden warning message are not reproduced and the elements of the background are reproduced when photocopied or scanned. Known line screen values that are used to print these types of hidden warning messages and backgrounds are, e.g., 65 LPI and 133 LPI, respectively (i.e., a line screen value ratio of approximately 2.)

In addition to selecting differing line screen values for the hidden warning message and the background pattern to allow them to be used to prevent duplication, it is also known to use different respective tonal screen values (i.e., the percentage of ink coverage) can also be selected to differ so that the hidden warning message more easily appears on a reproduction of the original document. Known tonal screen values that are used to print these types of hidden warning messages and background patterns are, e.g., 12% and 10%, respectively (i.e., a tonal screen value ratio of about 1.2).

Because of the disparity between the respective line screen values and respective tonal screen values of the hidden warning message and background pattern, a mere combination of these two techniques would not be effective because the hidden warning message would normally be visible to a casual observer of the original. To minimize the visible appearance of the warning message with this combined technique, the respective tonal screen values are selected so that they are more similar and/or a camouflage pattern can be printed over the hidden warning message and background to obscure the hidden warning message from a casual observer of the original document. The camouflage pattern may be defined by areas in which dots, lines, bars, or marks have been formed for both the hidden warning message and background pattern, or the background pattern may be defined by a pattern of dots, lines, bars, or marks which are smaller than or larger than those used in the hidden warning message and background pattern, or by areas of complete coverage of a paler ink.

A description of these aforementioned techniques can be found in U.S. Pat. Nos. 4,227,720 and 5,197,795.

Another technique and example for creating duplication resistant documents is illustrated in U.S. Pat. Nos. 5,271,645, 5,018,767, and 5,193,853, whereby printed line frequencies are printed at specific angles that mis-register with the protocols of electronic color scanners causing a moire pattern when copied.

While the above techniques have provided some degree of protection of original documents with respect to most copiers, in recent years digital scanners and color copiers have improved substantially. These new color copiers, such as the Canon 700 and 800 series, have made the above techniques less effective in protecting original documents. By manipulating the control settings on such devices, copies can be made of such original documents in which the hidden warning message does not readily appear on reproductions when some of the most commonly used frequency and element size combinations are used. When the contrast setting of these modern photocopiers are set to the lighter settings or the copier is set to a built-in halftone setting, the resolution of the copier is such that it neither reproduces the lower line screen value/high tonal screen value hidden warning message nor the higher line screen value/lower tonal screen value background pattern. If the line screen value and tonal screen value of the hidden warning message is adjusted so that the lower line screen value/high tonal screen value hidden warning message is reproduced at a lighter copier setting, both the higher line screen value/lower tonal screen value background pattern and the lower line screen value/higher tonal screen value hidden warning message are reproduced. In both cases, the hidden warning message does not readily appear on the reproduction of the original document, so that a casual observer of the document may not be alerted that the document they have is not the original.

A greater disparity between the respective line screen values and tonal screen values of the hidden warning message and background pattern would allow the hidden warning message to appear on a reproduction of the original document even with the manipulation of the copier. Due to the great disparity, however, presently known camouflage techniques do not adequately suppress the visual appearance of the hidden warning message on the original document. This could result in the original document being rejected as a copy which is not acceptable to issuers of the original.

There thus remains a need to provide a counterfeit resistant and copy resistant original document and technique that effectively suppresses the visual appearance of a hidden warning message on the original document, while at the same time, effectively causing the hidden message to visibly appear on copies of the original, thereby precluding an unscrupulous copyist from suppressing the hidden warning message on a reproduction of the original document by manipulation of the control settings of the copying or scanning device.

SUMMARY OF THE INVENTION

The present invention comprises a novel duplication resistant document and method of producing such a document that when reproduced exhibits a latent message. In a preferred method and embodiment of the present invention, a document comprises a substrate on which a message layer and a camouflaging layer are formed. The message layer comprises a latent message and a background. The contrast between the latent message and the background is such that the latent message is visible on a reproduction of the document. The dynamic camouflaging layer preferably comprises an environmentally varying ink; such as, thermochromic ink, that is formed onto the substrate as a camouflage pattern. The visual density of thermochromic ink inversely varies with temperature; such that, the appearance of the camouflaging layer is different at room temperatures and photocopying or scanning temperatures.

In alternative preferred embodiments, combinations of multi-tone contrasting layers, vignetted contrasting layers, multi-patterned dynamic camouflaging layers, and multi-spectral dynamic camouflaging layers are employed in accordance with the inventive features of the present invention.

DETAILED DESCRIPTION OF THE PREFERRED EMBODIMENT

Figure 1:
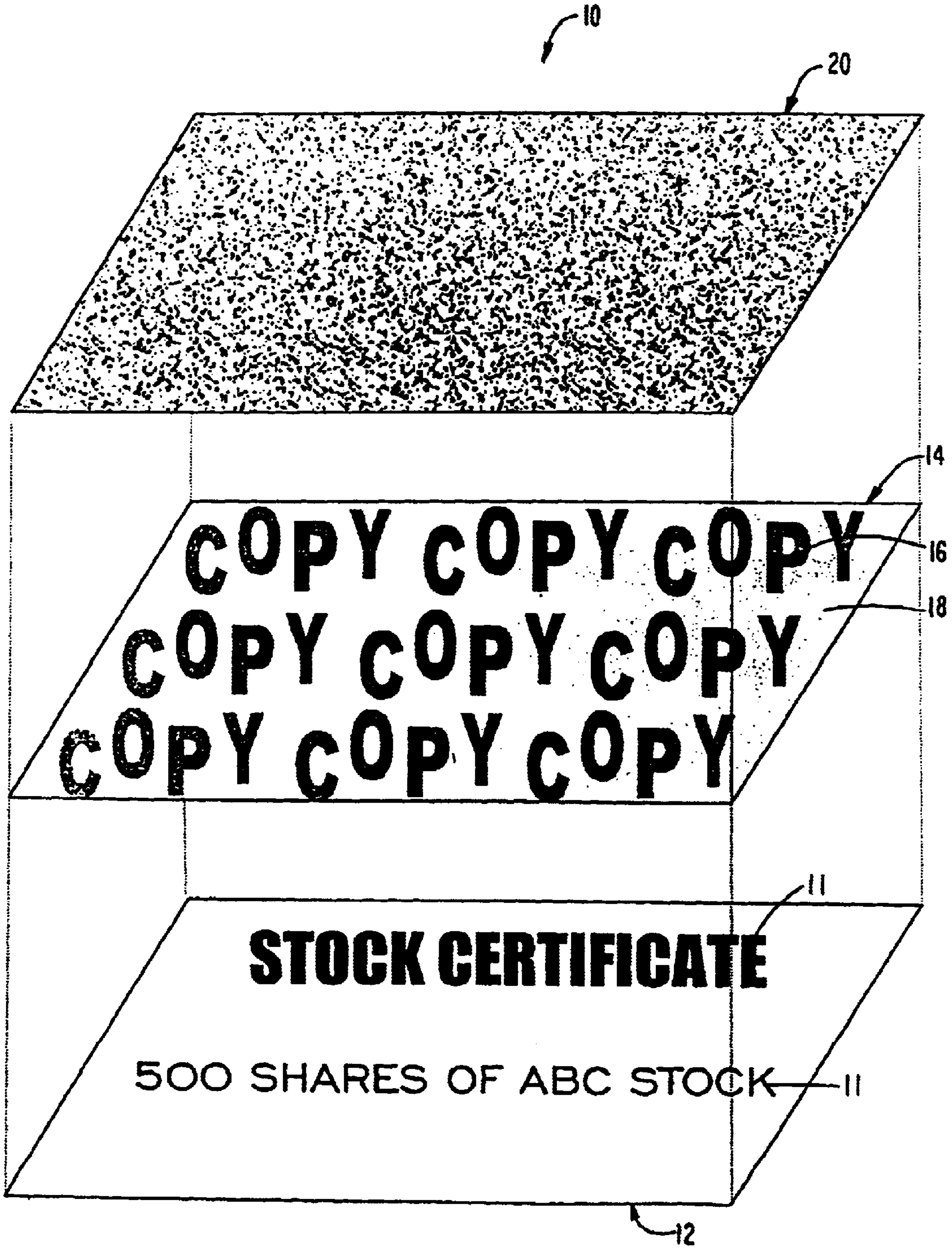
FIG. 1 is a depiction of an exploded view of a counterfeit-resistant document according to a preferred embodiment of the present invention.

FIG. 1 depicts a counterfeit-resistant original document 10 (in this case, a stock certificate) comprising a substrate 12, a contrasting layer 14 comprising a latent message 16 and a background 18, and a dynamic camouflaging layer 20 comprising a camouflage pattern 22. The substrate 12 is preferably of paper stock. Any material suitable for printing, however, may be used without departing from the scope of the present invention. As depicted, bearer information 11 is printed on the substrate 12. The contrasting layer 14 is printed on the substrate 12 over the bearer information 11, and the dynamic camouflaging layer 20 is printed over the contrasting layer 14.

Figure 2:
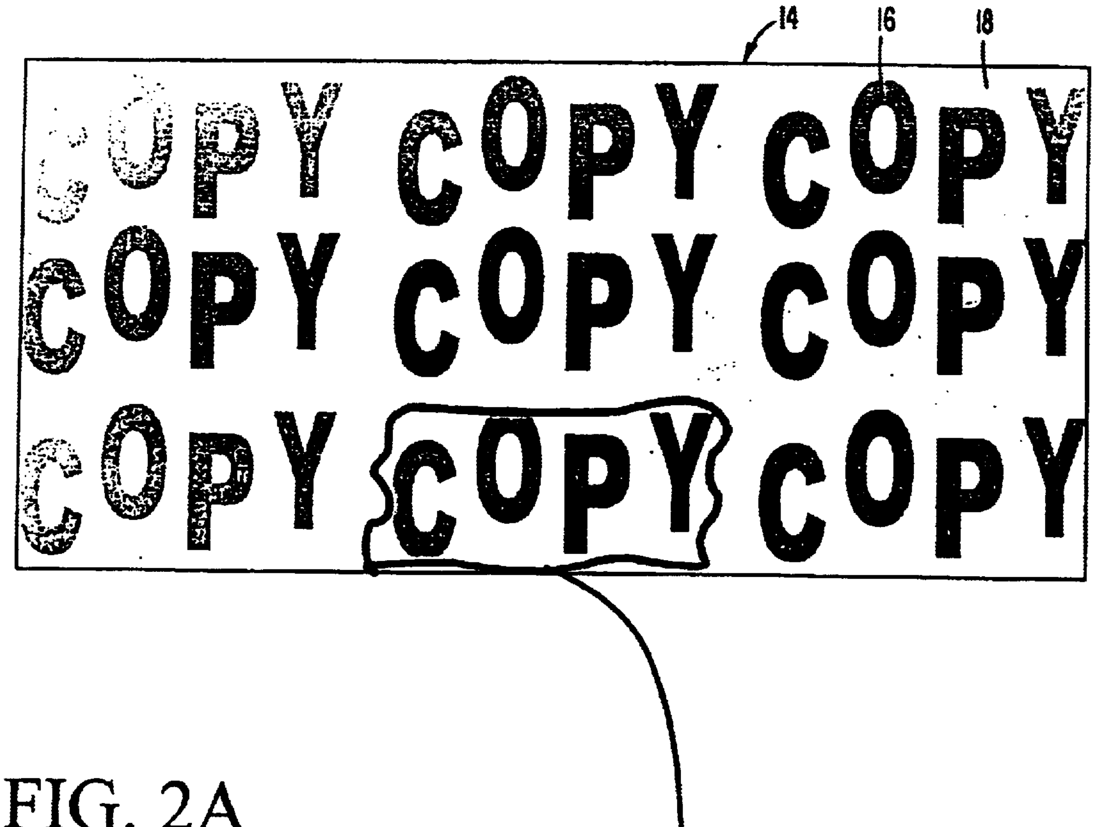
FIG. 2 is a depiction of a top view of the contrasting layer of the counterfeit-resistant document of FIG. 1.
Figure 2A:
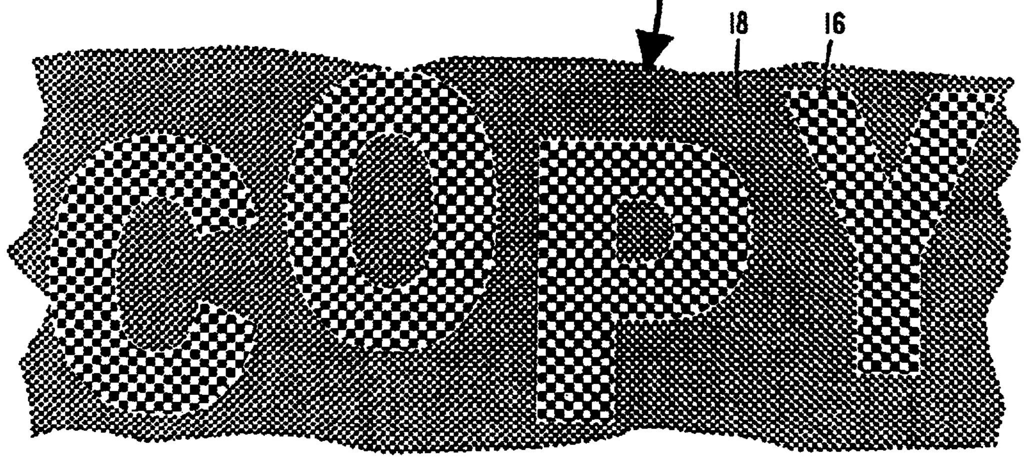
FIG. 2*a* is an enlargement of the circled latent image of FIG. 2.
Figure 3A:
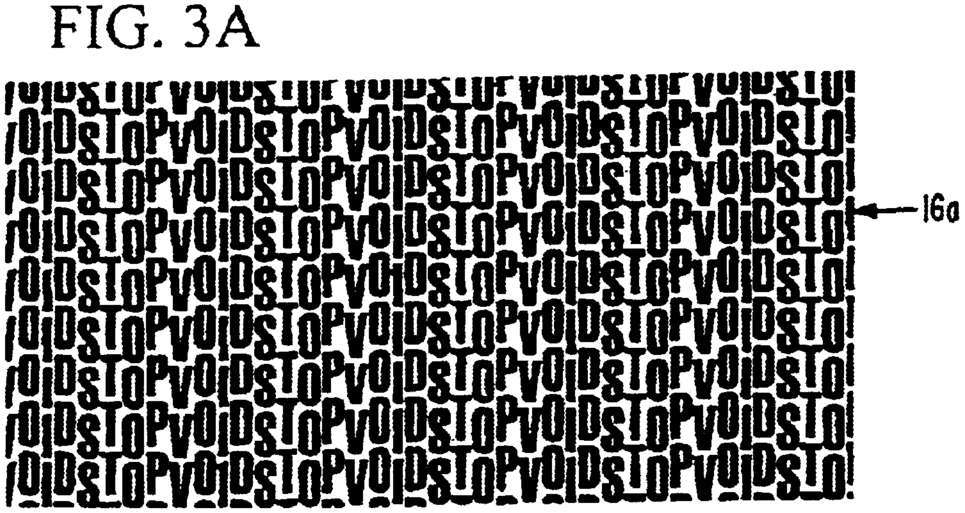
FIGS. 3A to 3E are latent messages that preferably employed with the contrasting layer of FIG. 1.
Figure 3B:
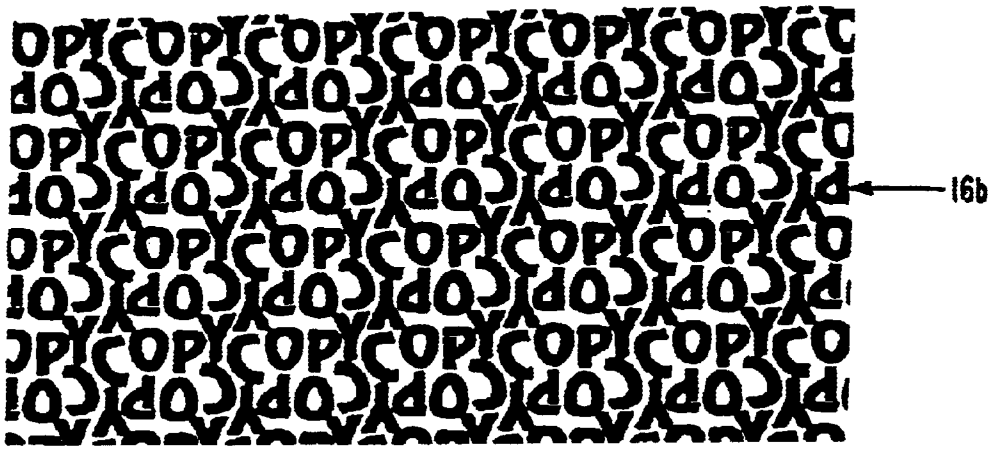
Figure 3C:
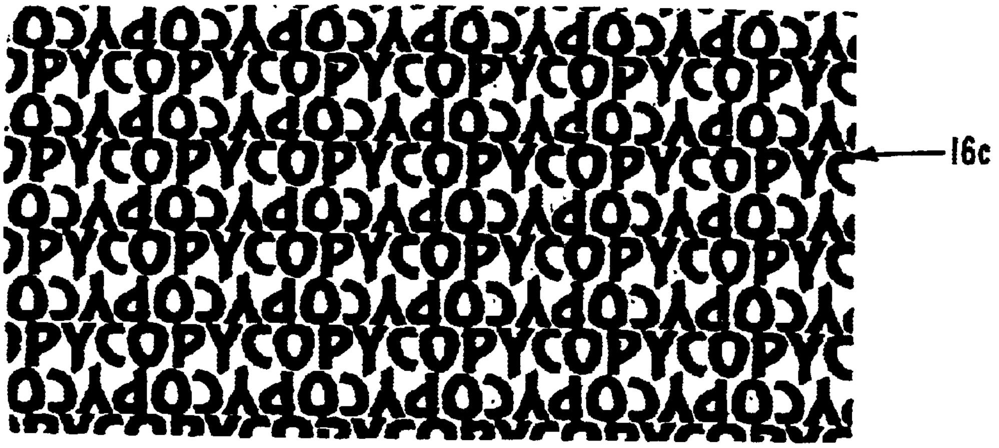
Figure 3D:
Figure 3E:
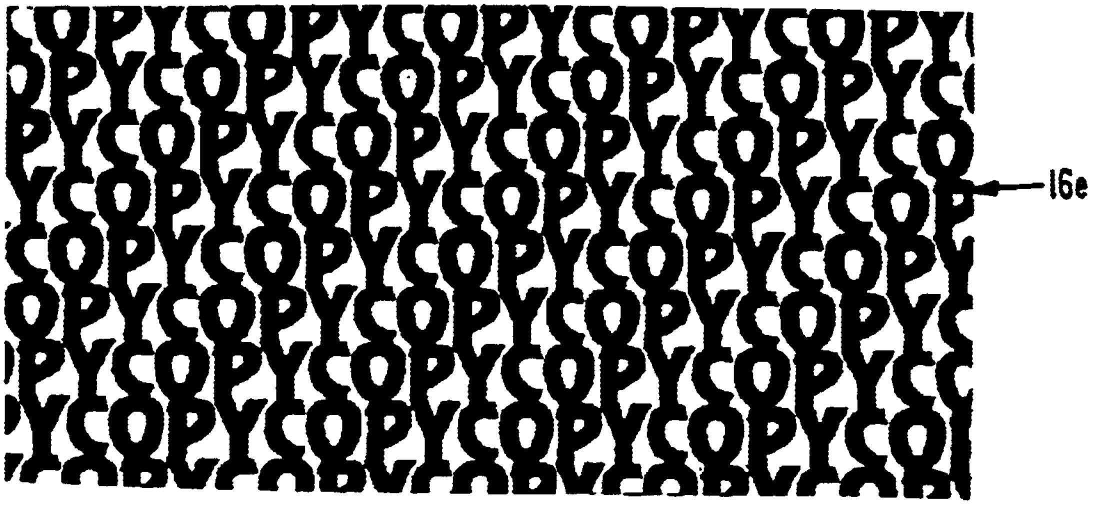

As shown in FIG. 2, the latent message 16 contrasts with the background 18 and visually appears to a casual observer in the absence of the dynamic camouflaging layer 20. The latent message 16 comprises text, as shown in FIG. 2, but can alternatively comprise any indicia; such as, an image that conveys information to an observer of the original document 10. The latent message 16 and background 18 are each printed as a halftone image. The latent message 16 comprises a pattern of elements with a relatively low line screen value and large element size. The background 18 comprises a pattern of elements with a relatively high line screen value and small element size. In the preferred embodiment, the elements are dots, but can alternatively comprise of lines or marks. The disparity between the contrast of the latent message 16 and the background 18 is, such that, the latent message 16 visually appears on the reproduction of the original document 10 over a wide range of copying device control settings. Respective line screen values for the latent message 16 and background of 50 LPI and 150 LPI (i.e., a line screen value ratio of 3), and respective tonal screen values for the latent message 16 and background 18 of 8% and 5% (i.e., a tonal screen value ratio of 1.6), result in the consistent visual appearance of the latent message 16 given the present state of the xerographical technology.

FIGS. 3A–3E, respectively, depict various examples of latent messages 16*a*–16*e* that can be formed in the contrasting layer 14, preferably, to enhance the suppression of the latent message 16 on the original document 10. The pattern of the latent message 16 is irregular, and the surface area covered by the latent message 16 is approximately equal to or greater than the surface area-covered by the background 18.

The graphics pattern of the dynamic camouflaging layer 20 plays a significant role in camouflaging the latent message 16. In general, the graphics pattern of the dynamic camouflaging layer 20 is preferably formed with a certain level of irregularity to its pattern to facilitate camouflaging of the latent message 16. The more irregular patterns, with a greater diversity of tones or alternating solid/open areas, are the easiest to print and camouflage the latent message 16, but lose some effectiveness when digitally copied. On the other hand, the smoother, more evenly spaced patterns, are more difficult to print without noticing the latent message 16, but are more effective when digitally copied.

FIGS. 4A–4G respectively depict various examples of camouflage patterns 22*a*–22*g*, that can be effectively employed with the dynamic camouflaging layer 20. The camouflage pattern 22 can comprise words such as shown in the camouflage pattern 22*e* of FIG. 4E.

The ratio of the area of the printed markings, to the total area on which the markings are printed, is preferably approximately 50% to provide a more similar visual appearance between the latent message 16 and the background 18, thereby, aiding in the suppression of the latent image 16 to a casual observer of the original document 10.

The ink density of the dynamic camouflaging layer 20 also plays a role in camouflaging the latent message 16. Ink density or color is a sensory perception and can be perceived only in conjunction with light. The light penetrates into the transparent color of the ink film. When passing through the ink, the light continuously strikes against pigments, which, depending on the ink film thickness and the pigment concentration, absorb a greater or lesser part of certain wavelengths of light. When the light rays finally reach the printed substrate surface they are reflected back. After traveling back through the printed ink film, that proportion of the light which has not been absorbed by the ink, exits. It is this part of the light that is perceived by the eye of the observer and forms the assessment basis for color saturation. It is also this part of the light that is optically recognized by electronic devices.

There is a correlation between ink film thickness and ink density. The absorption behavior of an ink film depends on, the hue, the ink film thickness, and on the nature, as well as, the concentration of the printing ink pigmentation. Since, however, the color hue for process colors is standardized and the pigment concentration for these colors is also specified within a certain framework, only the ink film thickness remains as a variable which can be influenced.

The amount of light that is reflected from the surface of the printed substrate can be measured by a GreyTag D19C densitometer to quantify the density variations the eye perceives. Ink density values are expressed as logarithmic numbers. As the logarithmic density values increase, the amount of available light decreases. For example, a density of 0.00 indicates that 100% of incident light is reflected. A density of 1.00 indicates that only 10% of the incident light is reflected. A density of 2.00 indicates that only 1% of the incident light is reflected. This conversion is designed to adapt the density measurement to the peculiarities of the human sensory perception.

In general, as the density of the dynamic camouflaging layer 20 increases, the less the light incident on the contrasting layer 14 is reflected back through the dynamic camouflaging layer 20, and the more the latent message 16 is suppressed with respect to the original document 10. Suppression of the latent message 16 furthers the interest of not falsely alerting a casual observer of the original document 10 that it is otherwise. As the density of the dynamic camouflaging layer 20 decreases, the more the light incident on the contrasting layer 14 is reflected back through the dynamic camouflaging layer 20, and the more the latent message 16 is exhibited. Exhibition of the latent message 16 furthers the interest of allowing a copying device to capture the latent message 16, thereby creating a reproduction of the original document 16 on which the latent message 16 visually appears to a casual observer. In light of these countervailing interests, it is difficult, using standard inks, to both suppress a message situated in a highly contrastable pattern of an original document during normal viewing conditions and exhibit the message on a reproduction of the original document. Such is this case, with the latent message 16 found in the contrasting layer 14.

The dynamic camouflaging layer 20 comprises an environmentally density changing ink, such as a thermochromic ink (i.e., an ink the color and density of which changes with temperature). The thermochromic ink is formulated with heat crystals, which renders the pigment portion of the ink subject to spectral changes when exposed to specific temperature levels. Thus, the thermochromic ink will undergo a visible change in density and color (i.e., hue and/or saturation) when exposed to the proper temperature range. The thermochromic ink, used to form the dynamic camouflaging layer 16, darkens as the temperature decreases, and lightens as the temperature increases. In general, the darker the ink, the greater the visual density. Thus, the visual density of the thermochromic ink is inversely proportional to the temperature to which the ink is exposed. The composition and method of making thermochromic inks, and effects thereof, are disclosed in pending application Ser. No. 08/602,243, now U.S. Pat. No. 5,873,604, entitled "Document Security System Having Thermographic Pantograph and Validation Mark," and filed by George K. Phillips on Feb. 16, 1996, which is fully incorporated herein by reference.

Because the visual density of the thermochromic ink is inversely proportional to temperature levels, the color of the dynamic camouflaging layer 20 darkens at or below room temperature, thus becoming more dense and facilitating the suppression of the latent message 16 on the original document 10 during normal viewing conditions; and lightens at temperatures to which typical copying devices subject a document (i.e., scanning temperatures), thus becoming less dense and facilitating the exhibition of the latent message 16 on a reproduction of the original document 10.

Figure 5:
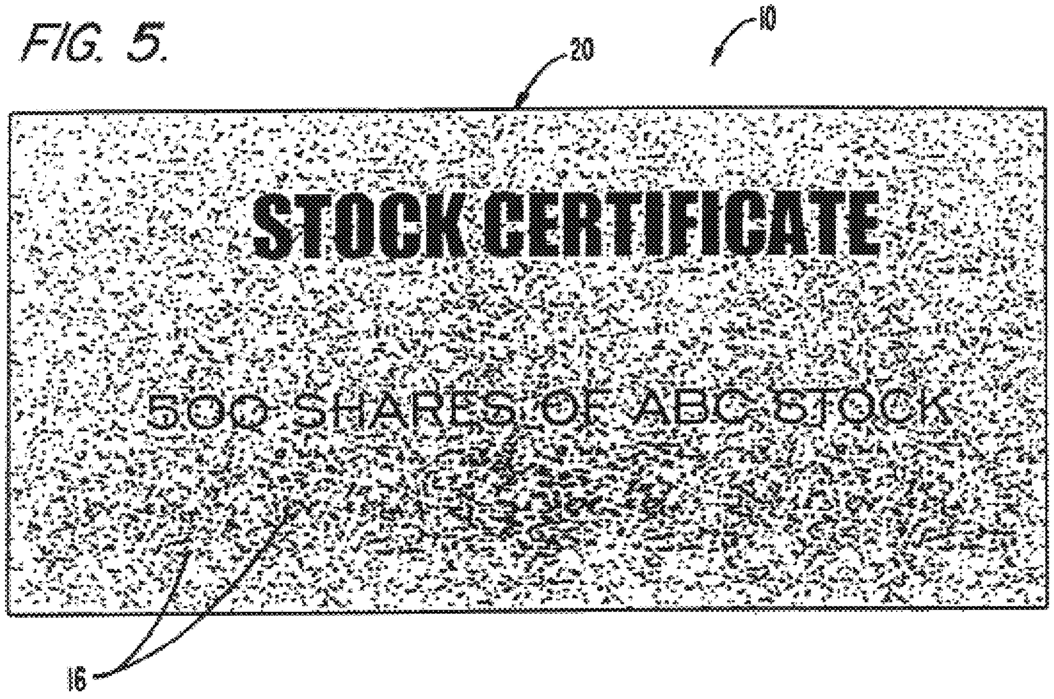
FIG. 5 is a depiction of a top view of the original counterfeit-resistant document of FIG. 1.
Figure 6:
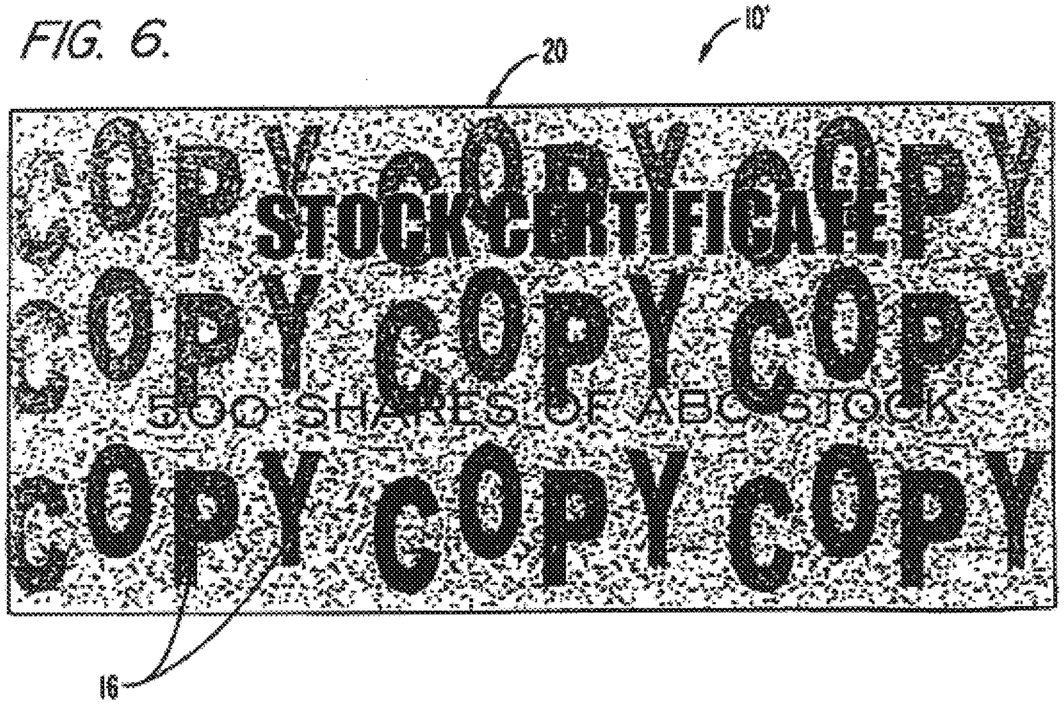
FIG. 6 is a depiction of a top view of a reproduction of the counterfeit-resistant document of FIG. 5.

The thermochromic ink has a dormant state when exposed to a low-level temperature range, and an activated state when exposed to a high-level temperature range. That is, the dynamic camouflaging layer 20 suppresses the contrasting layer 16 at room temperature, so that the latent image 16 does not visually appear to a casual observer of the original document 10 (shown in FIG. 5); and exhibits the contrasting layer 16 during scanning temperatures, so that the latent image 16 visually appears to a casual observer of a reproduction 10' of the original document 10 (shown in FIG. 6).

Selection of the exact color, reactive properties and graphics of the dynamic camouflaging layer 20 is preferably coordinated with the selection of the contrasting properties of the contrasting layer 14. As the disparity between the respective line screen values and respective tonal screen values of the latent message 14 and the background 16 increases, the need for graphic balancing complexity and visual density of the dynamic camouflaging layer 20 at room temperature increases. Conversely, as the disparity between the respective line screen values and respective tonal screen values of the latent message 14 and the background 16 decreases, the need for graphic balancing complexity and visual density of the dynamic camouflaging layer 20 at scanning temperatures decreases.

The particular thermochromic ink selected preferably has a visual density at room temperature that is high enough to effectively suppress the latent message 16 on the original document 10; and a visual density at scanning temperatures that is low enough to effectively exhibit the underlying latent message 16 on a reproduction of the original document 10. If the latent message 16 and background 18, respectively, have screen values of 50 LPI and 10% and 150 LPI and 5%, thermochromic inks having a cold visual density level (i.e., a visual density level measured at 60° F. or below) between 0.15 and 0.80, and a warm visual density level (i.e., a visual density level measured at 76° or above) between 0.02 and 0.22 measured with a GREYTAG D19C densitometer, are preferably employed. The presently most preferred thermochromic inks, however, are thermochromic inks that have a cold visual density level between 0.15 and 0.35 and a warm visual density level between 0.08 and 0.22. The exact composition of thermochromic ink is preferably modified to effect the exact visual density changing properties of the thermochromic ink. Ultimately, selection of a preferred thermochromic ink depends on the exact temperatures to which the ink will be exposed and the opaqueness and color hue pigmentation of the ink.

The particular arrangement of the dynamic camouflaging layer 20 is preferably varied to optimize the camouflaging of the latent message 16. The patterns shown in FIGS. 4A–4G, to varying extents, suppress the latent message 16 when viewing the original document 10; while exhibiting the latent message 16 when viewing a reproduction of the original document 10 given the above-mentioned cold and warm visual density ranges. In alternative embodiments, the environmentally varying ink used to form the dynamic camouflaging layer 20 is a photochromic ink (i.e., an ink the color of which changes with the intensity of light). The visual density of the photochromic ink is inversely proportional with the intensity of light. Under a low-intensity light (e.g., ambient light found in a lit room), the visual density of the photochromic ink, like the thermochromic ink, is high enough that the latent image 14 on the original document 10 is suppressed. On the other hand, under a high-intensity light (e.g., light produced by a copier or scanner), the visual density of the photochromic ink, like the thermochromic ink, is low enough that the latent image 14 appears on the reproduction of the original document 10.

Figure 7:
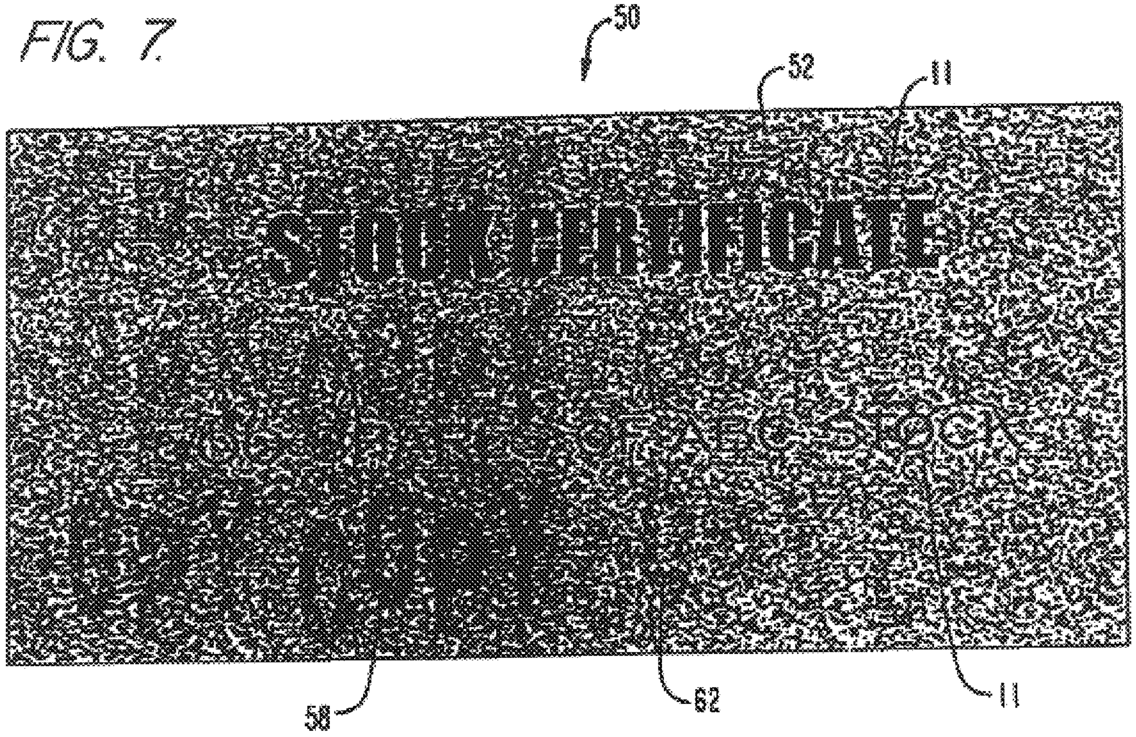
FIG. 7 is a depiction of a top view of a multi-tone counterfeit-resistant document according to an alternative preferred embodiment of the present invention.
Figure 8:
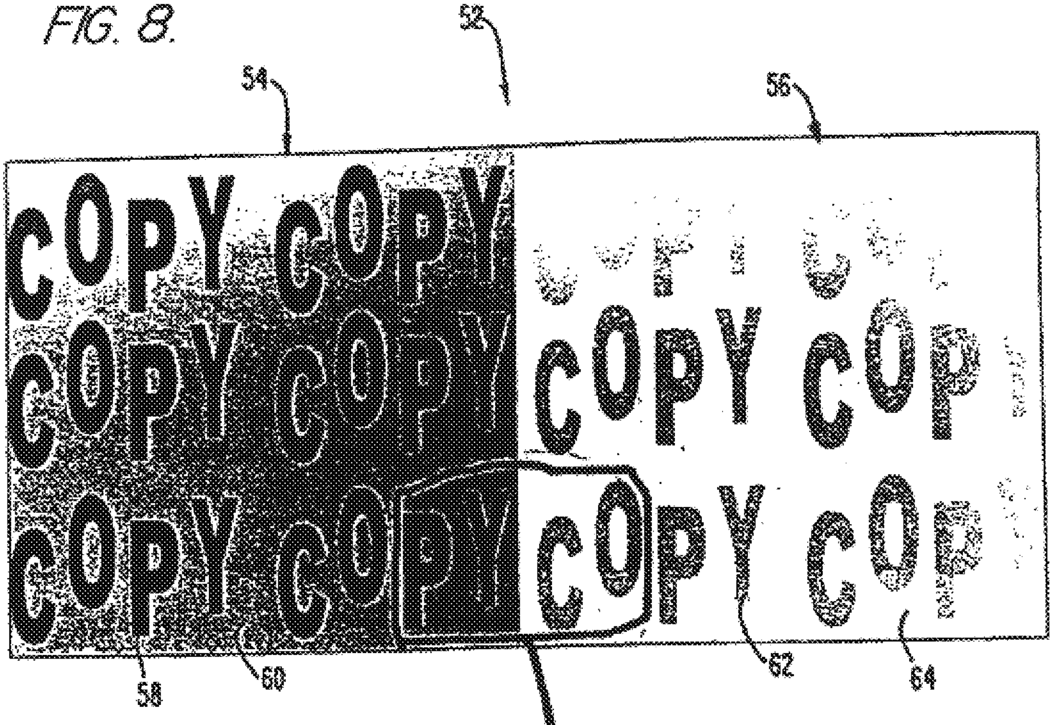
FIG. 8 is a depiction of a top view of a multi-tone contrasting layer of the multi-tone counterfeit-resistant document of FIG. 7.
Figure 8A:
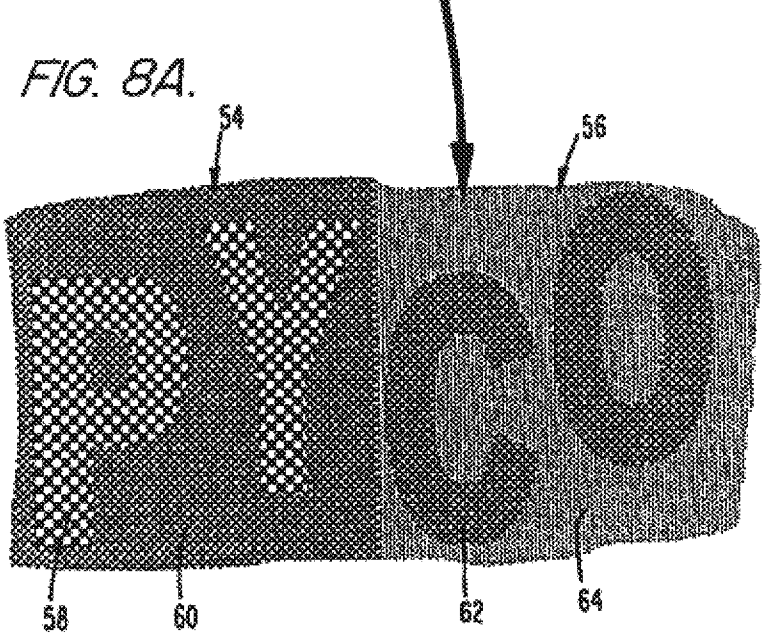

FIG. 7 depicts an alternative preferred embodiment of a counterfeit-resistant original document 50 comprising a multi-tone contrasting layer 52 (see FIG. 8). To the extent the particular aspects of the original document 50 are the same as those of the original document 10, the same reference numerals have been used.

As shown in FIG. 8, the multi-tone contrasting layer 52 has a first contrasting portion 54 and a second contrasting portion 56. The first contrasting portion 54 comprises a first latent message 58 (faintly shown in FIG. 7) and a first background 60. The elements of the first latent message 58 are larger than the elements of the first background 60. Alternatively, however, the elements of the first latent message 58 are smaller than the elements of the first background 60. The second contrasting portion 56 comprises a second latent message 62 (faintly shown in FIG. 7) and a second background 64. The elements of the second latent message 62 are larger than the elements of the second background 64. Alternatively, however, the elements of the second latent message 62 are smaller than the elements of the second background 64.

The respective line screen values of the first latent message 58 and the second latent message 62 are different. Alternatively, however, the respective line screen values of the first latent message 58 and the second latent message 62 are the same. The respective line screen values of the first background 60 and the second background 64 are different. Alternatively, however, the respective line screen values of the first background 60 and the second background 64 are the same.

For instance, one useful combination is a line screen value of 50 LPI at 25% tonal screen value for the first latent message 58 and 150 LPI at 15% tonal screen value for the first background 60; and 50 LPI at 10% tonal screen value for the second latent message 62 and 150 LPI at 5% tonal screen value for the second background 64. Another useful combination is a line screen value of 50 LPI at 25% tonal screen value for the first latent message 58 and 150 LPI at 15% tonal screen value for the first background 60; and 65 LPI at 12% tonal screen value for the second latent message 62 and 130 LPI at 5% tonal screen value for the second background 64. Still another useful combination is a line screen value of 50 LPI at 10% tonal screen value for the first latent message 58 and 150 LPI at 50% tonal screen value for the first background 60; and 50 LPI at 15% tonal screen value for the second latent message 62 and 150 LPI at 5% tonal screen value for the second background 64.

Figure 9:
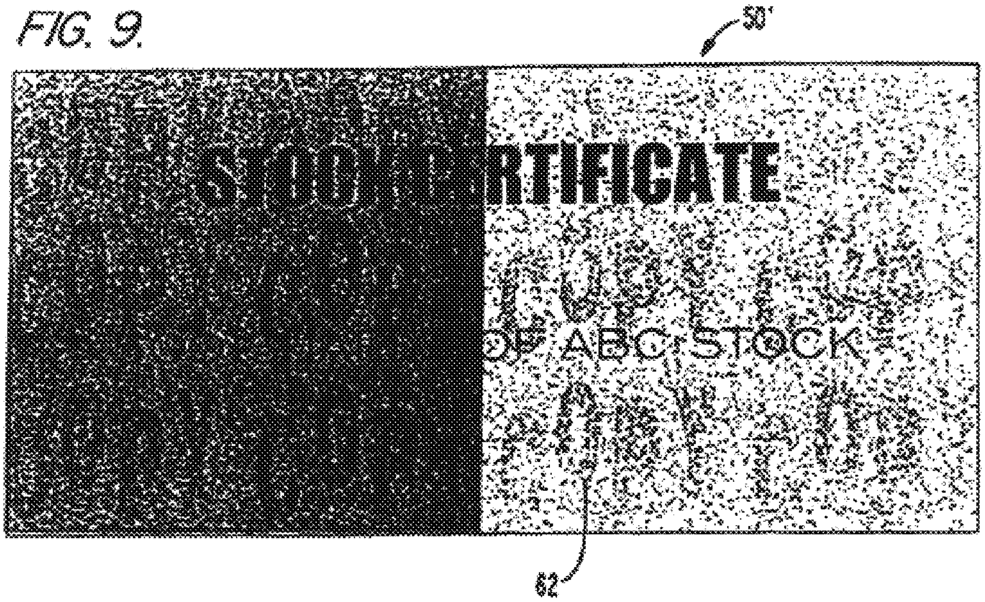
FIG. 9 is a depiction of a top view of a reproduction of the counterfeit-resistant document of FIG. 7 produced at a first copying device control setting.
Figure 10:
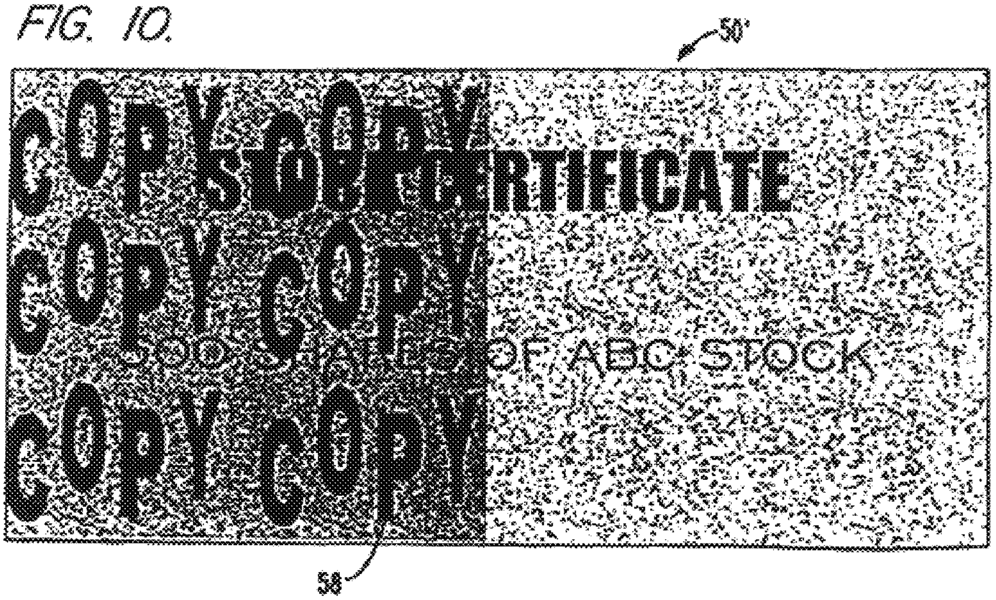
FIG. 10 is a depiction of a top view of a reproduction of the counterfeit-resistant document of FIG. 7 produced at a second copying device control setting.

The first contrasting portion 54 has an overall tonal screen value that is more than that of the second contrasting portion 56, and the first contrasting portion 54 appears darker than the second contrasting portion 56. This enhances the difficulty of a copyist's manipulation of the control settings on the copying device in order to suppress the latent message on the reproduction of the original document 50. That is, if the copying device is adjusted to obscure or eliminate the first latent message 58, the second latent message 62 will appear on a reproduction 50' of the original document 50, as shown in FIG. 9. Likewise, if the copying device is adjusted to obscure or eliminate the second latent message 62, the first latent message 58 will appear on the reproduction 50' of the original document 50, as shown in FIG. 10.

Figure 11:
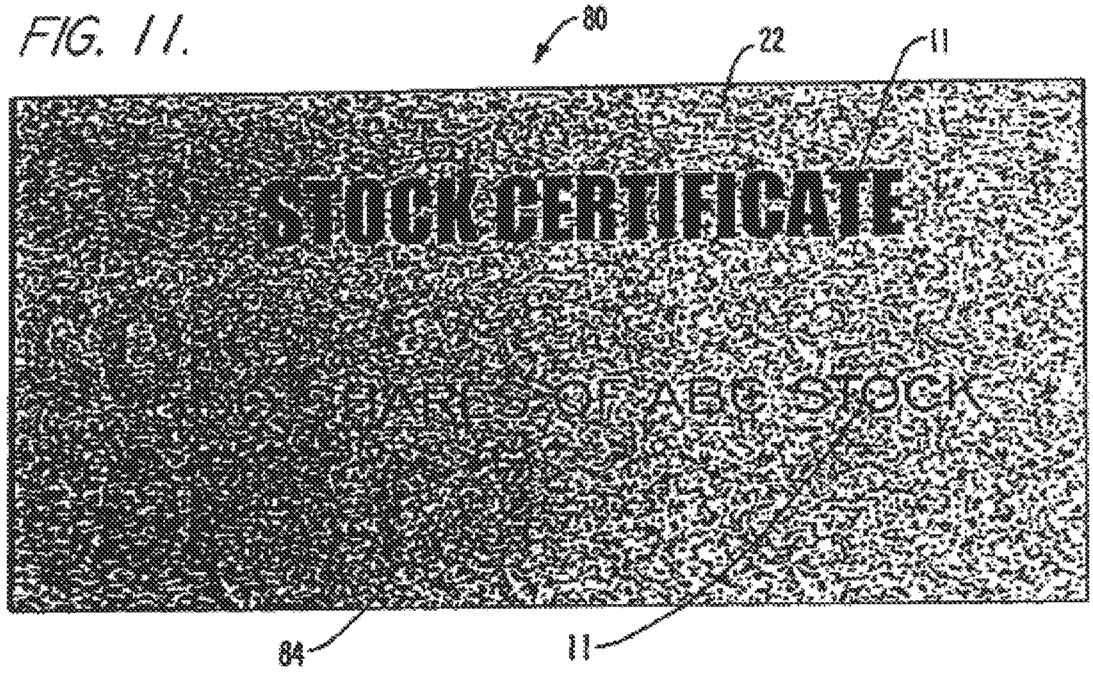
FIG. 11 is a depiction of a top view of a counterfeit-resistant document according to an alternative preferred embodiment of the present invention.
Figure 12:
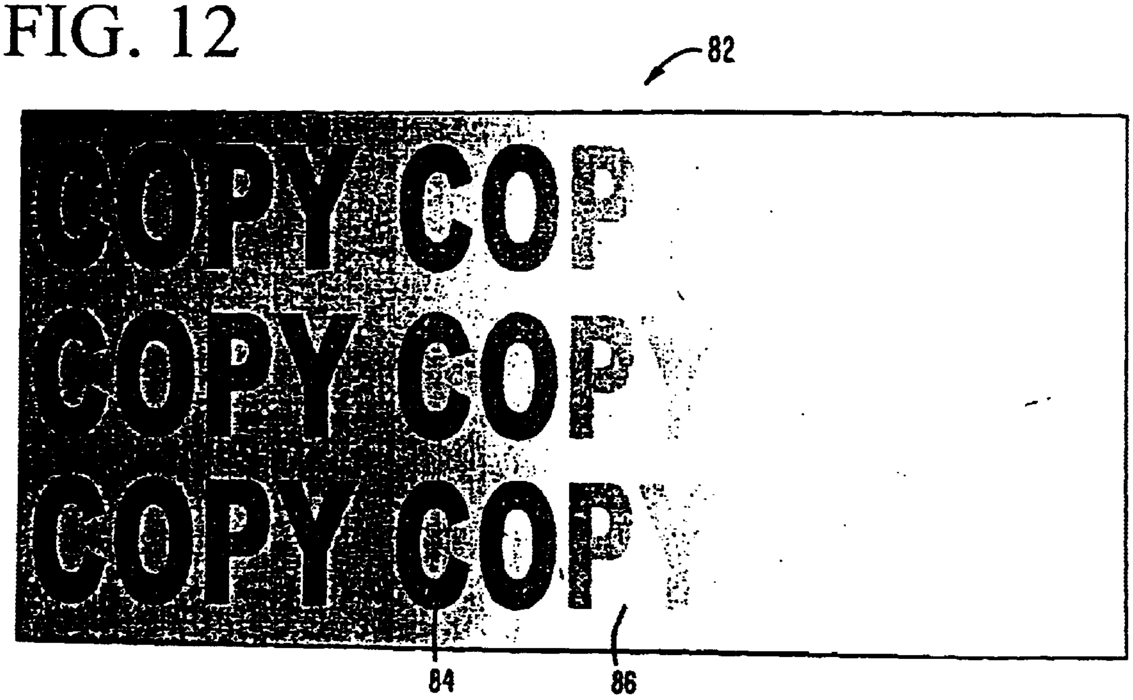
FIG. 12 is a depiction of a top view of a vignetted contrasting layer employed in the counterfeit-resistant document of FIG. 11.

FIG. 11 depicts an alternative preferred embodiment of a counterfeit-resistant original document 80 comprising a vignetted contrasting layer 82 as shown in FIG. 12. To the extent the particular aspects of the original document 80 are the same as those of the original document 10, the same reference numerals have been used.

As depicted in FIG. 12, the vignetted contrasting layer 82 comprises a latent message 84 (shown faintly in FIG. 11) and a background 86. The respective line screen values of the latent message 84 and the background 86 differ and are constant across the vignetted contrasting layer 82. Preferably, the respective line screen values for the latent message 84 and background 86 are 50 LPI and 150 LPI. The size of the elements of the latent message 84 and background 86 differ and gradually vary across the vignetted contrasting layer 82. That is, the tonal screen value of the vignetted contrasting layer 82 varies. Preferably, the respective tonal screen values of the latent message 84 and background 86 varies from 30% and 20% to 15% and 5% across the vignetted contrasting layer 82. The tonal screen value of the illustrated vignetted contrasting layer 82 is preferably varied in steps, producing bands of slightly differing tone. In some applications, however, the tonal screen value of the vignetted contrasting layer 82 can continuously vary. The element size of the latent message 84 and the background 86 shown in FIG. 12 preferably vary horizontally across the original document 80. The element size of the latent message 84 and the background 86 preferably vary in any direction (e.g., vertically or diagonally).

Figure 13:
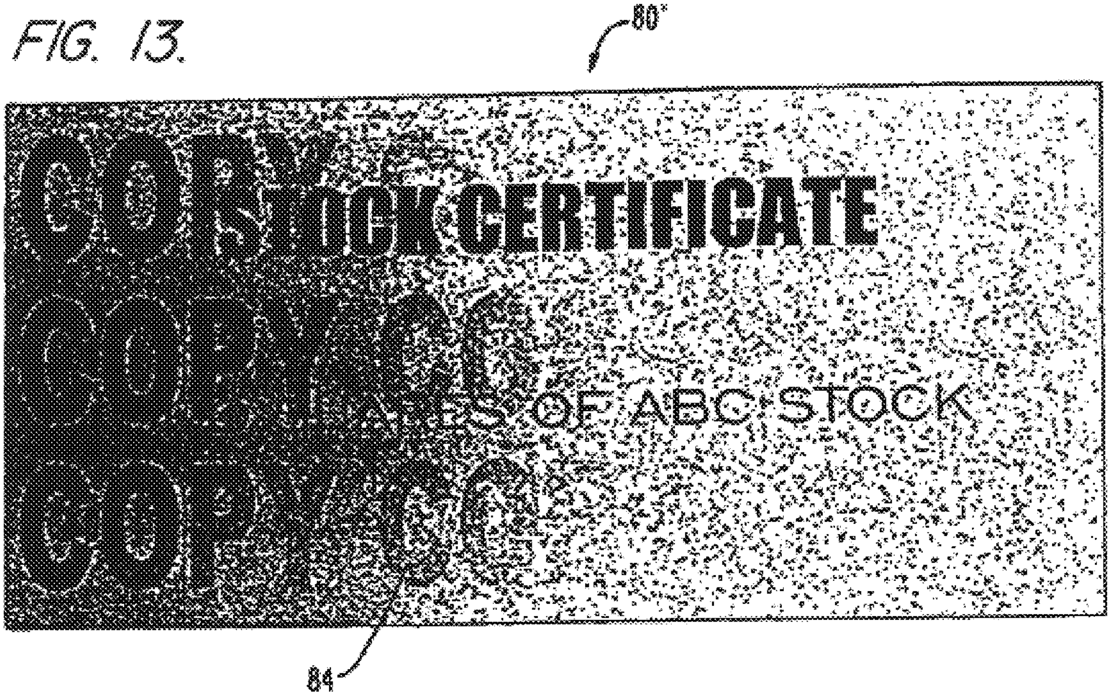
FIG. 13 is a depiction of a top view of a reproduction of the counterfeit-resistant document of FIG. 11 produced at a first copying device control setting.
Figure 14:
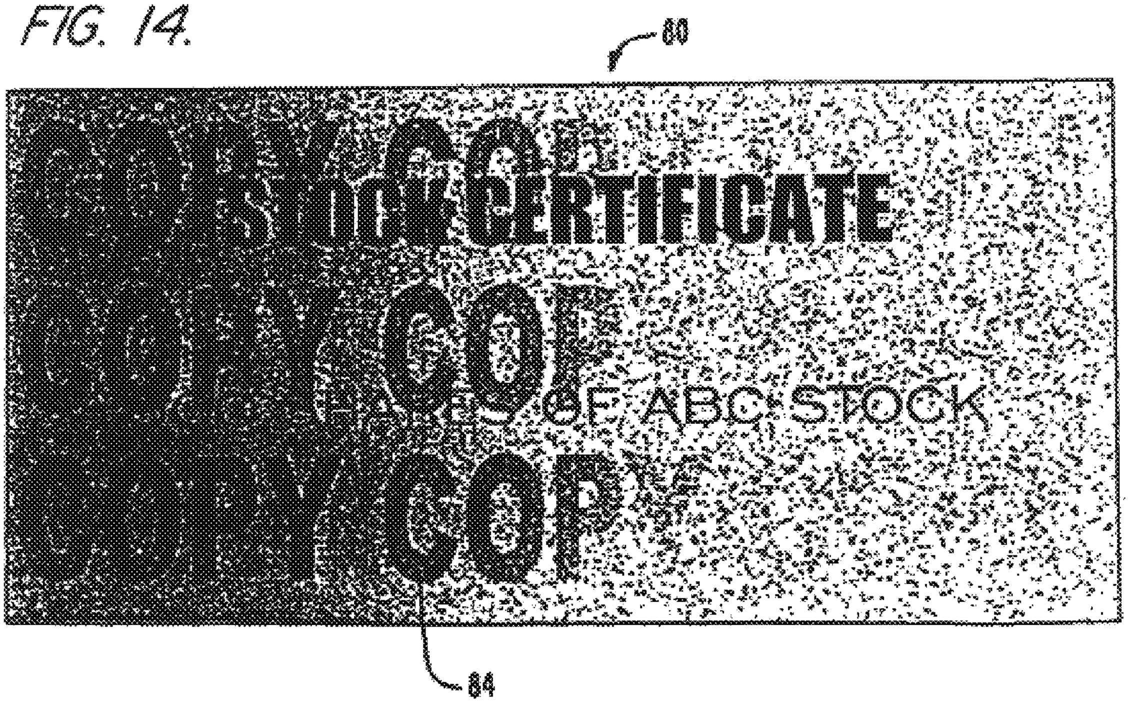
FIG. 14 is a depiction of a top view of a reproduction of the counterfeit-resistant document of FIG. 11 produced at a second copying device control setting.

As with the multi-tone contrasting layer 52, the additional feature provided by the vignetted contrasting layer 82 enhances the difficulty of the copyist in manipulation of the control settings on the copying device in an attempt to suppress the latent message on the reproduction of the original document 80. That is, if the copying device is adjusted to obscure or eliminate the latent message 84, at least a portion of the latent message 84 will appear on a reproduction 80' of the original document 80 as shown in FIGS. 13 and 14, since the tonal screen value of the vignetted contrasting layer 82 varies.

Figure 15:
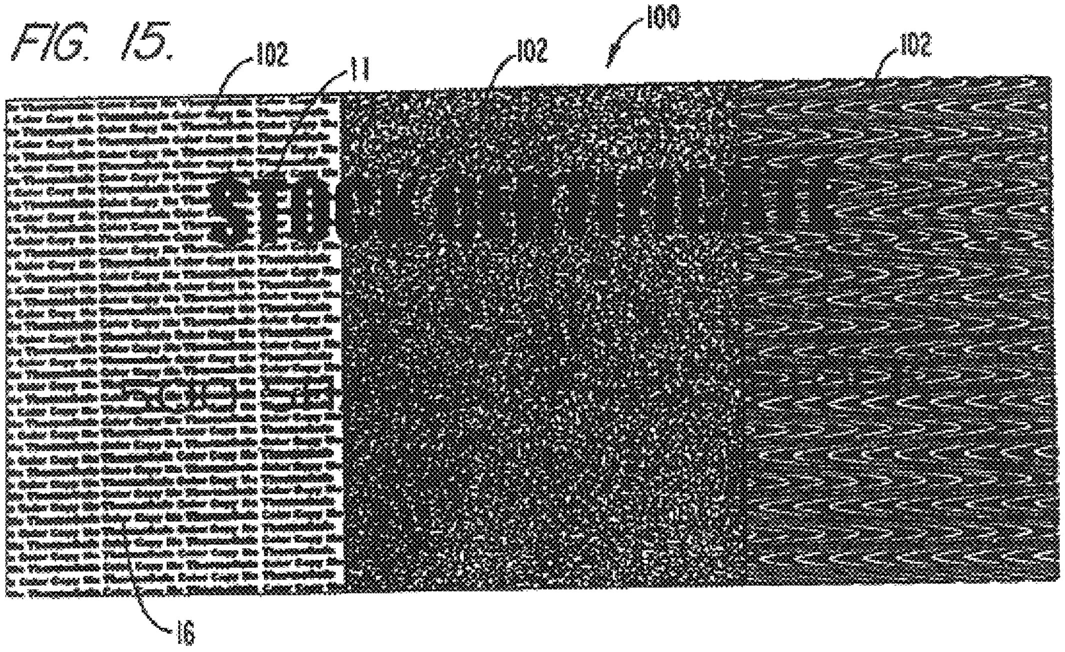
FIG. 15 is a depiction of a top view of a counterfeit-resistant document exhibiting a multi-patterned dynamic camouflaging layer according to an alternative preferred embodiment of the present invention.

In alternative embodiments, the element size of the latent message 84 varies across the across the vignetted contrasting layer 82, while the element size of the background 86 remains uniform across the vignetted contrasting layer 82; or the element size of the background 86 varies across the vignetted contrasting layer 82, while the element size of the latent message 84 remains uniform across the vignetted contrasting layer 82. FIG. 15 depicts an alternative preferred embodiment of an original document 100 comprising a multi-patterned dynamic camouflaging layer 102. To the extent the particular aspects of the original document 100 are the same as those of the original document 10, the same reference numerals have been used.

Figure 4A:
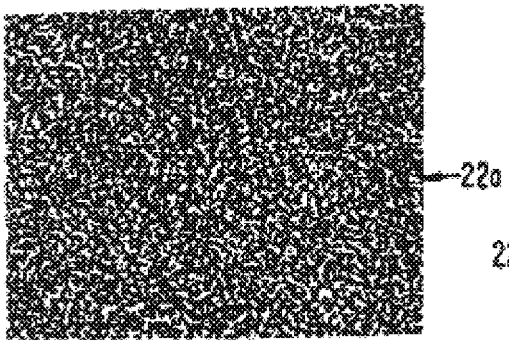
FIGS. 4A to 4G are camouflage patterns preferably employed with the dynamic camouflaging layer of the counterfeit-resistant document of FIG. 1.
Figure 4E:
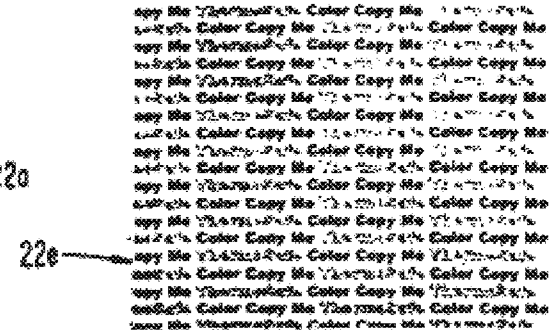
Figure 4B:
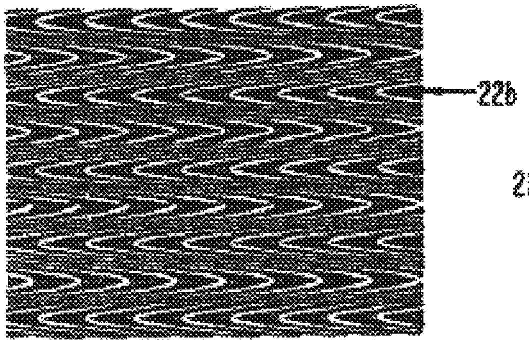
Figure 4F:
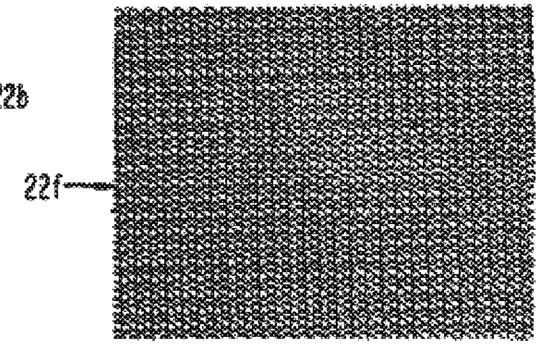
Figure 4C:
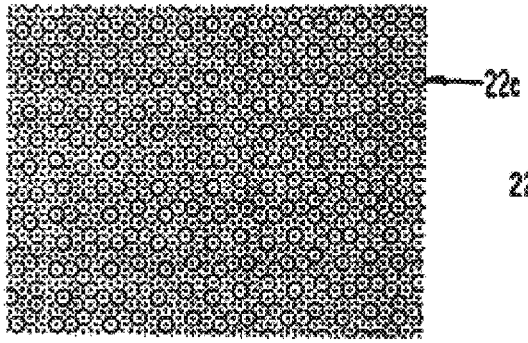
Figure 4G:
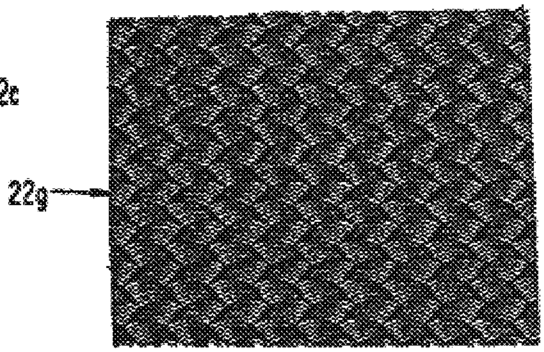
Figure 4D:
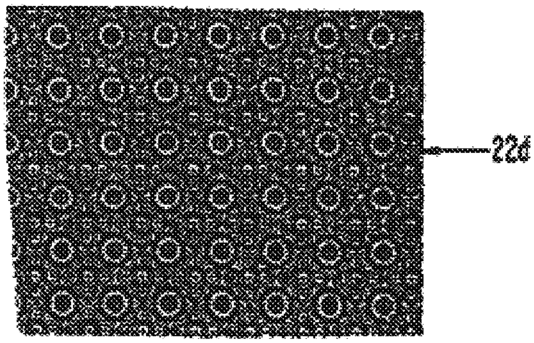
Figure 16:
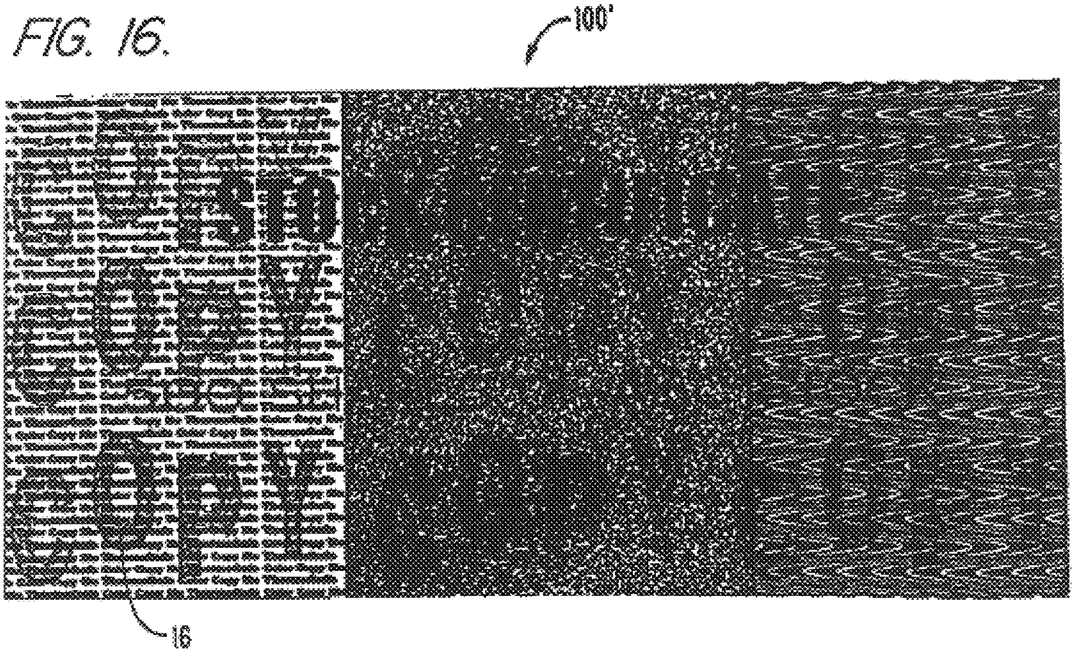
FIG. 16 is a depiction of a top view of a reproduction of the counterfeit-resistant document of FIG. 15.

The multi-patterned dynamic camouflaging layer 102 comprises multiple camouflage patterns, such as the camouflage patterns 22*e*, 22*a*, and 22*b* depicted respectively in FIGS. 4E, 4A, and 4B. The multiple camouflage patterns are preferably selected to have differing suppression characteristics. As with the contrasting layers 52 and 82, the multi-pattern dynamic camouflaging layer 102 enhances the difficulty of the copyist to manipulate the copying device control settings in an attempt to suppress the latent message 16 on the reproduction of the original document 100. That is, because the multiple camouflage patterns provide differing suppression characteristics, it is more difficult to suppress the entire latent image 16 of the original document 100 as shown by a reproduction 100' of the original document 100 in FIG. 16.

Figure 17:
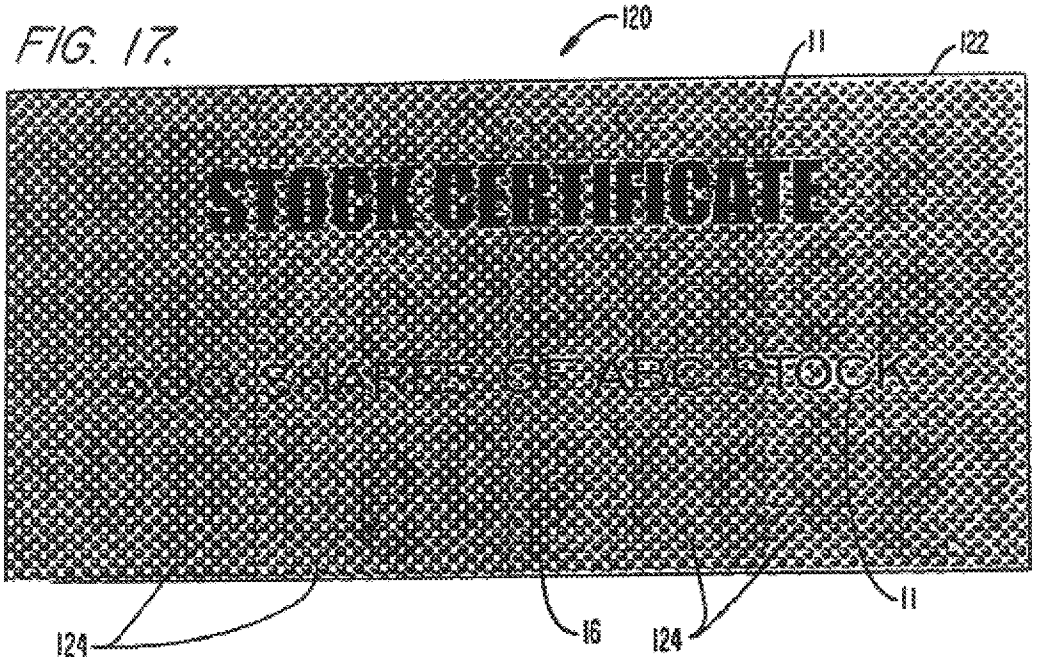
FIG. 17 is a depiction of a top view of a counterfeit-resistant document exhibiting a discrete multi-spectral dynamic camouflaging layer according to an alternative preferred embodiment of the present invention.

FIG. 17 depicts an alternative preferred embodiment of an original document 120 comprising a discrete multi-spectral dynamic camouflaging layer 122. To the extent the particular aspects of the original document 120 are the same as those of the original document 10, the same reference numerals have been used.

The discrete multi-spectral dynamic camouflaging layer 122 comprises thermochromic ink that exhibits multiple colors and densities at any given temperature. The density of the thermochromic ink varies discretely over the discrete multi-spectral dynamic camouflaging layer 122 exhibiting discrete bands 124 of differing colors.

Figure 18:
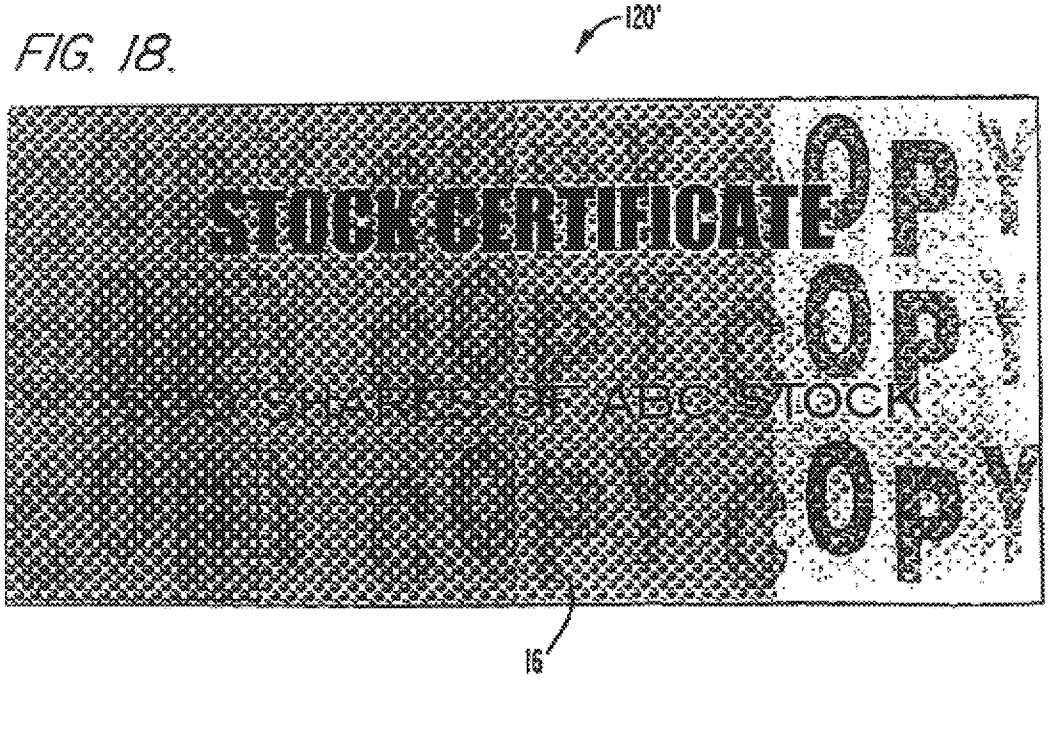
FIG. 18 is a depiction of a top view of a reproduction of the counterfeit-resistant document of FIG. 17.

As with the multi-patterned dynamic camouflaging layer 102, the discrete multi-spectral dynamic camouflaging layer 122 enhances the difficulty of the copyist in manipulating the copying device control settings in an attempt to suppress the latent message 16 on a reproduction 120' of the original document 120' as depicted in FIG. 18. That is, because the multiple colored thermochromic ink densities provide differing suppression characteristics, it is more difficult to suppress the entire latent message 16 on the reproduction 120' of the original document 120.

Figure 19:
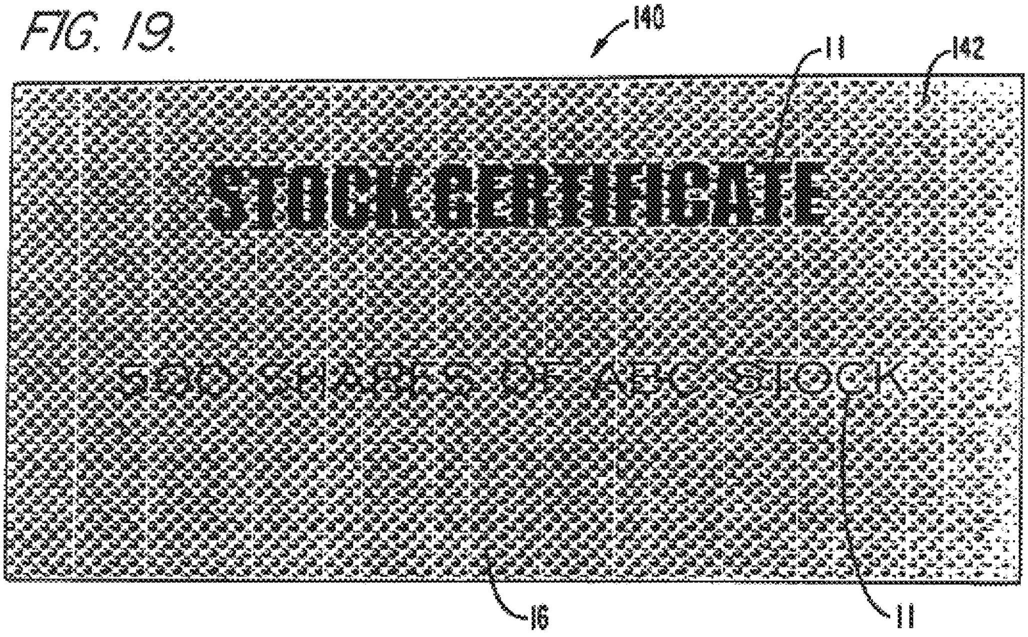
FIG. 19 is a depiction of a top view of a counterfeit-resistant document exhibiting a prismatic multi-spectral dynamic camouflaging layer according to an alternative preferred embodiment of the present invention.

FIG. 19 depicts an alternative preferred embodiment of an original document 140 comprising a prismatic multi-spectral dynamic camouflaging layer 142. To the extent the particular aspects of the original document 140 are the same as those of the original document 10, the same reference numerals have been used. The prismatic multi-spectral dynamic camouflaging layer 142 differs from the discrete multi-spectral dynamic camouflaging layer 122 in that the colors and density of the thermochromic ink varies continuously, rather than discretely over the prismatic multi-spectral dynamic camouflaging layer 142 exhibiting a prismatic effect.

Figure 20:
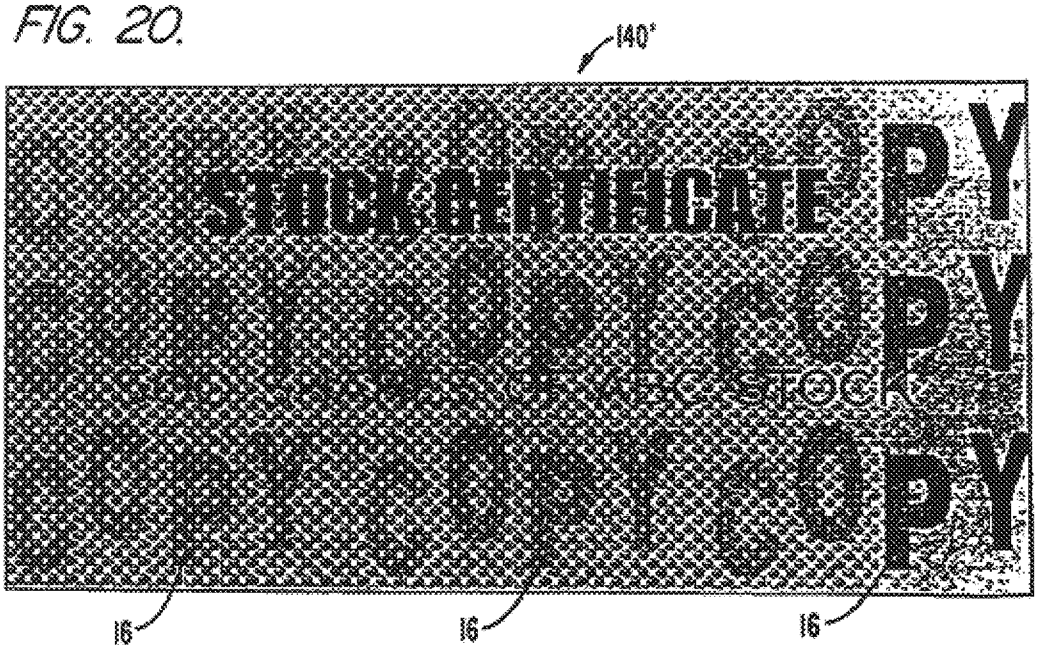
FIG. 20 is a depiction of a top view of a reproduction of the counterfeit-resistant of FIG. 19.

As with the discrete multi-spectral dynamic camouflaging layer 122, the prismatic multi-spectral dynamic camouflaging layer 142 enhances the difficulty of the copyist in manipulating the copying device control settings in an attempt to suppress the latent message 16 on a reproduction 140' of the original document 140' as depicted in FIG. 20.

The preferred contrasting layers 14, 52 and 82, and the preferred dynamic camouflaging layers 20, 102, 122, and 142 can be combined in various ways to enhance the protection provided in further alternative preferred embodiments of the present invention.

Figure 21:
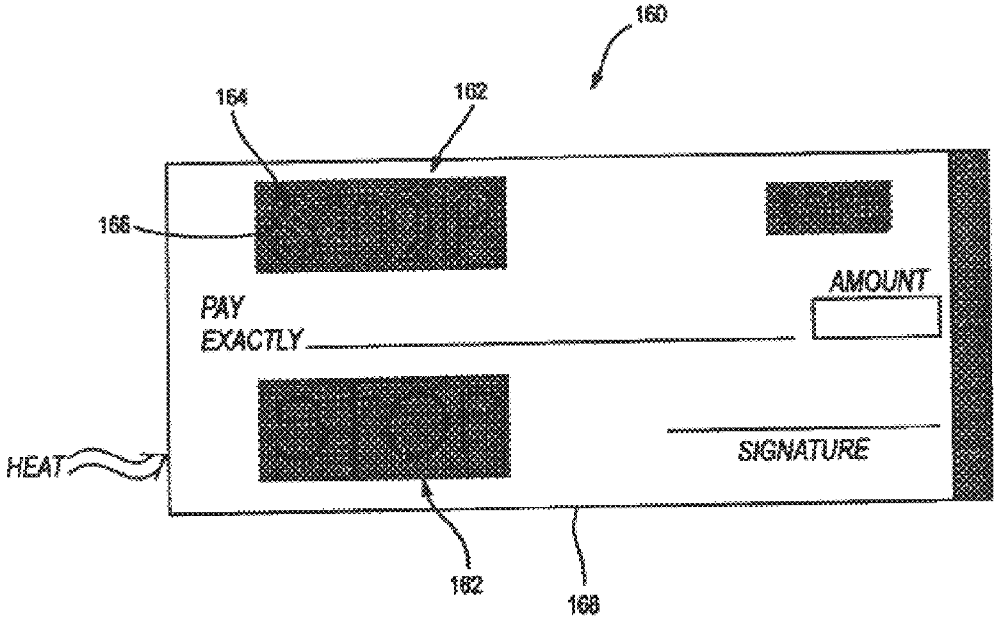
FIG. 21 is a depiction of a top view of a counterfeit-resistant document according to an alternative preferred embodiment of the present invention.

In an alternative embodiment, the above-disclosed features can be incorporated into a document 160 having a thermochromic pantograph 162, as depicted in FIG. 21. The thermochromic pantograph 162 comprises a latent image 164, which is concealed or obscured within the graphics of a camouflaged background pattern 166. The latent image 164 layer of ink is preferably applied directly to substrate 168 while the thermochromic ink of the camouflage background pattern 166 is overprinted or trap produced within the latent image layer.

While embodiments and applications of this invention have been shown and described, it would be apparent, to the readers of this description, that many more modifications are possible without departing from the inventive concepts described herein. The invention, therefore, is not to be restricted beyond the scope and in the spirit of the appended claims.

What is claimed is:

1. A counterfeit-resistant document, comprising:

a substrate;

a contrasting layer disposed on said substrate; and a dynamic camouflaging layer disposed on and masking said contrast layer when viewing an original of said document under human viewing conditions independent of viewing angle.

2. The counterfeit-resistant document of claim 1, wherein said contrasting layer comprises a latent message and a background;

wherein said dynamic camouflaging layer is disposed on and masks said latent message and said background; and wherein said dynamic camouflaging layer comprises an environmentally density changing ink.

3. The counterfeit-resistant document of claim 1, wherein said dynamic camouflaging layer comprises a thermochromic ink.

4. The counterfeit-resistant document of claim 1, wherein said dynamic camouflaging layer comprises a photochromic ink.

5. The counterfeit-resistant document of claim 2, wherein said dynamic camouflaging layer comprises a camouflage pattern.

6. The counterfeit-resistant document of claim 5, wherein said latent message and said background are both printed in a half-tone.

7. The counterfeit-resistant document of claim 6, wherein said document further comprises bearer information.

8. The counterfeit-resistant document of claim 7, wherein said contrasting layer has a line screen value ratio of at least 2.

9. The counterfeit-resistant document of claim 7, wherein said contrasting layer has a tonal screen value ratio of at least 1.2.

10. The counterfeit-resistant document of claim 7, wherein said contrasting layer has a line screen value ratio greater than 2 and a tonal screen value ratio greater than 1.2.

11. The counterfeit-resistant document of claim 7, wherein the line screen value of one of said latent message and said background is at least 50 LPI and the line screen value of another of said latent message and said background is at most 150 LPI.

12. The counterfeit-resistant document of claim 7, wherein the tonal screen value of said one of said latent message and said background is at least 8% and the tonal screen value of said another of said latent message and said background is at most 5%.

13. The counterfeit-resistant document of claim 7, wherein said latent message has a tonal value of at least 8% and said background has a tonal value of at most 5%.

14. The counterfeit-resistant document of claim 7, wherein said background has a tonal value of at least 8% and said latent message has a tonal value of at most 5%.

15. The counterfeit-resistant document of claim 10, wherein said latent message covers a first area of said substrate and said background covers a second area of said substrate, said first area being equal to or greater than second area.

16. The counterfeit-resistant document of claim 15, wherein said camouflage pattern covers a third area of said substrate and said thermochromic ink of said camouflage pattern covers in area of said substrate equal to or greater than third area.

17. The counterfeit-resistant document of claim 10, wherein said thermochromic ink has a cold visual density level of between 0.15 and 0.80 and a warm visual density level of between 0.02 and 0.22.

18. The counterfeit-resistant document of claim 17, wherein said thermochromic ink has a cold visual density level of between 0.15 and 0.35 and a warm visual density level of between 0.08 and 0.22.

19. A counterfeit-resistant document, comprising:

a substrate;

a contrasting layer disposed on said substrate; and a dynamic camouflaging layer disposed on and masking said contrasting layer when viewing an original of said document under human viewing conditions, said dynamic camouflaging layer comprising an environmentally density changing ink.

20. The counterfeit-resistant document of claim 19, wherein said contrasting layer is a multi-tone contrasting layer.

21. The counterfeit-resistant document of claim 20, wherein said multi-tone contrasting layer comprises a first contrasting portion and a second contrasting portion, said first contrasting portion comprising a first latent message and a first background, said second contrasting portion comprising a second latent message and a second background; and wherein said dynamic camouflaging layer is disposed on and masks said first latent message, said first background, said second latent message, and said second background.

22. The counterfeit-resistant document of claim 21, wherein said first latent message, said second latent message, said first background, and said second background are printed in half-tone, said first latent message has a first latent message tonal screen value and said second latent message has a second latent message tonal screen value, and said first latent message tonal screen value is greater than said second latent message tonal screen value.

23. The counterfeit-resistant document of claim 22, wherein said first background has a first background tonal screen value and said second background has a second background tonal screen value, and said first background tonal screen value is greater than said second background tonal screen value.

24. The counterfeit-resistant document of claim 22, wherein said first latent message has a first latent message line screen value, said second latent message has a second latent message line screen value, said first background has a first background line screen value and a first background tonal value, and said second background has a second background line screen value and a second background tonal value, said first latent message line screen value differing from said first background line screen value, and said second latent message line screen value differing from said second background line screen value.

25. The counterfeit-resistant document of claim 24, wherein said first latent message tonal value is greater than said first background tonal value, said first latent message line screen value is less than said first background line screen value, said second latent message tonal value is greater than said second background tonal value, and said second latent message line screen value is less than said second background line screen value.

26. The counterfeit-resistant document of claim 19, wherein said contrasting layer is a vignetted contrasting layer.

27. The counterfeit-resistant document of claim 26, wherein said vignetted contrasting layer comprises a latent message and a background, said dynamic camouflage layer is disposed on and masks said latent message and said background, and one of said latent message and said background having a tonal screen value that varies gradually across said vignetted contrasting layer.

28. The counterfeit-resistant document of claim 27, wherein said one of said latent message and said background has a line screen value that is uniform across said vignetted contrasting layer.

29. The counterfeit-resistant document of claim 28, wherein said tonal screen value varies from between 30% and 20% to between 15% and 5% across said vignetted contrasting layer.

30. The counterfeit-resistant document of claim 29, wherein said one of said latent message and said background is said latent message.

31. The counterfeit-resistant document of claim 19, wherein said dynamic camouflaging layer is a multi-patterned dynamic camouflaging layer.

32. The counterfeit-resistant document of claim 31, wherein said multi-patterned dynamic camouflaging layer comprises at least three distinct camouflage patterns.

33. The counterfeit-resistant document of claim 19, wherein said dynamic camouflaging layer is a multi-spectral dynamic camouflaging layer.

34. The counterfeit-resistant document of claim 33, wherein said multi-spectral dynamic camouflaging layer comprises thermochromic ink that exhibits multiple densities at a given temperature.

35. The counterfeit-resistant document of claim 34, wherein said multi-spectral dynamic camouflaging layer is a discrete multi-spectral dynamic camouflaging layer.

36. The counterfeit-resistant document of claim 34, wherein said multi-spectral dynamic camouflaging layer is a prismatic multi-spectral dynamic camouflaging layer.

37. The counterfeit-resistant document of claim 19, wherein said dynamic camouflaging layer masks said contrasting layer independent of viewing angle.

38. A method of creating a counterfeit-resistant document, the method comprising the steps:

selecting a graphics pattern for a contrasting layer;

selecting a graphics pattern for a dynamic camouflaging layer;

applying said contrasting layer pattern to said substrate to create a contrasting layer on said substrate; and applying said dynamic camouflaging pattern to said contrasting layer to create a dynamic camouflaging layer that masks said contrasting layer when viewing an original of said document under human viewing conditions.

39. The method of claim 38, wherein said contrasting layer pattern and said dynamic camouflaging layer pattern are selected such that a latent message is suppressed on said document by said dynamic camouflaging layer and said latent message is exhibited on a reproduction of said document.

40. The method of claim 39, wherein said contrasting layer selection step comprises selecting said latent message and a background, such that said latent message is exhibited on said reproduction over a copying range, including the highest and lowest photocopying device exposure settings, wherein said reproduction is a discernible reproduction of said document.

41. The method of claim 40, wherein said dynsmic csmouflsging lsyer delection step further comprises selecting a thermochromic ink having a visual density that inversely varies with temperature.

42. The method of claim 41, wherein said thermochochromic ink has a cold density, such that said dynamic camouflaging layer is inactivated at room temperatures, and a warm density, such that said dynamic camouflaging layer is activated at scanning temperatures.

43. The method of claim 42, further comprising the step of applying bearer information to said substrate.

44. The method of claim 38, wherein said dynamic camouflaging layer masks said contrasting layer independent of viewing angle.

* * * * *